United States Patent
Ress, Jr.

(10) Patent No.: US 11,661,905 B1
(45) Date of Patent: May 30, 2023

(54) 2D VARIABLE-AREA PLUG NOZZLE

(71) Applicant: Florida Turbine Technologies, Inc., Jupiter, FL (US)

(72) Inventor: Robert A. Ress, Jr., Carmel, IN (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 17/577,216

(22) Filed: Jan. 17, 2022

(51) Int. Cl.
*F02K 1/12* (2006.01)

(52) U.S. Cl.
CPC ...... *F02K 1/123* (2013.01); *F05D 2240/1281* (2013.01); *F05D 2250/12* (2013.01); *F05D 2250/141* (2013.01); *F05D 2250/313* (2013.01); *F05D 2250/323* (2013.01); *F05D 2250/90* (2013.01); *F05D 2300/603* (2013.01)

(58) Field of Classification Search
CPC .......... F02K 1/006; F02K 1/12; F02K 1/1223; F02K 1/62; F02K 1/002; F02K 1/008; F02K 1/085; F02K 1/123; F02K 1/1292; F05D 2250/323; F05D 2260/15; B64D 33/04
See application file for complete search history.

(56) References Cited

U.S. PATENT DOCUMENTS

| | | | | |
|---|---|---|---|---|
| 3,814,325 A * | 6/1974 | McCardle, Jr | ........ | F02K 1/1261 60/771 |
| 4,295,611 A * | 10/1981 | Wynosky | .............. | F02K 1/1261 239/265.37 |
| 4,361,281 A * | 11/1982 | Nash | ....................... | B64D 33/04 239/265.37 |
| 4,566,270 A * | 1/1986 | Ballard | .................... | F02K 1/825 239/265.17 |
| 4,690,329 A * | 9/1987 | Madden | .................... | F02K 1/62 239/265.19 |
| 4,778,109 A * | 10/1988 | Jourdain | ................. | F02K 1/006 244/110 B |
| 5,016,818 A * | 5/1991 | Nash | ..................... | F02K 1/1223 239/265.19 |
| 5,050,803 A * | 9/1991 | Wakeman | ............... | F02K 1/006 239/265.19 |
| 5,335,489 A * | 8/1994 | Thayer | .................... | F02K 1/008 239/265.17 |

(Continued)

FOREIGN PATENT DOCUMENTS

| | | | | |
|---|---|---|---|---|
| EP | 1195512 B1 * | 7/2010 | ............. | B64C 15/02 |
| EP | 3536943 A1 * | 9/2019 | ............... | F02K 1/12 |

(Continued)

*Primary Examiner* — Craig Kim
(74) *Attorney, Agent, or Firm* — Koenig IP Works, PLLC; Katherine Koenig

(57) ABSTRACT

A two-dimensional variable area plug (2D VAP) nozzle assembly for a high-speed flight vehicle. In one embodiment, a 2D VAP nozzle assembly comprises a nozzle including a plurality of sidewalls; a plug body within the nozzle, the plug body abutting at least two of the plurality of sidewalls; a first convergent flap hingedly connected to at least one of the plurality of sidewalls; and a second convergent flap hingedly connected to at least one of the plurality of sidewalls. In one embodiment, the nozzle assembly includes only a first convergent flap and a second convergent flap, without diverging flaps. The 2D VAP nozzle assembly has a simplified design with reduced sidewall length, which results in reduced manufacturing and maintenance costs.

19 Claims, 4 Drawing Sheets

(56) References Cited

U.S. PATENT DOCUMENTS

| | | | | |
|---|---|---|---|---|
| 5,484,105 | A * | 1/1996 | Ausdenmoore | F02K 1/82 60/770 |
| 5,680,755 | A * | 10/1997 | Hauer | F02K 1/805 60/230 |
| 5,690,280 | A * | 11/1997 | Holowach | F02K 1/006 239/265.19 |
| 5,779,150 | A * | 7/1998 | Lidstone | F02K 1/383 239/265.17 |
| 5,820,024 | A * | 10/1998 | Ausdenmoore | F02K 1/15 239/265.41 |
| 5,941,065 | A * | 8/1999 | Lidstone | F02K 1/085 239/265.17 |
| 7,475,548 | B2 * | 1/2009 | Toffan | F02K 1/008 239/265.35 |
| 8,020,367 | B2 * | 9/2011 | Toffan | F02C 3/13 60/228 |
| 11,566,584 | B1 * | 1/2023 | Gormley | F02K 1/123 |
| 11,619,192 | * | 4/2023 | Kirkbride | B64D 27/18 60/772 |
| 2004/0123598 | A1 * | 7/2004 | Ackermann | F23R 3/06 60/752 |
| 2021/0301760 | A1 * | 9/2021 | Sutterfield | F02K 1/62 |
| 2022/0324186 | A1 * | 10/2022 | Staal | B29C 73/10 |
| 2023/0035756 | A1 * | 2/2023 | Dindar | F02K 1/18 |

FOREIGN PATENT DOCUMENTS

| | | | | |
|---|---|---|---|---|
| EP | 3892545 A1 * | 10/2021 | | B64D 27/16 |
| JP | 2003252694 A * | 9/2003 | | |

* cited by examiner

2D VARIABLE-AREA PLUG NOZZLE

GOVERNMENT RIGHTS STATEMENT

This invention was made with Government support under Contract No. FA8650-19-D-2056-FA8650-19-F-2112 awarded by the Air Force. The U.S. Government has certain rights in this invention.

CROSS-REFERENCE TO RELATED APPLICATIONS

N/A.

FIELD

The present technology is related generally to an exhaust nozzle for a high-speed flight vehicle and, in particular, to a 2D variable-area plug nozzle.

BACKGROUND

One mode of powering a high supersonic, low hypersonic flight vehicle is with an air-breathing dual-mode propulsion system having a low-speed mode and a high-speed mode. For the low-speed mode, a turbojet or turbofan engine is generally utilized. The low-speed mode ranges from a ground takeoff or subsonic air launch to the Mach 2-3 range. For the high-speed mode, a ramjet engine is generally utilized to power a vehicle out to the Mach 5 range. The integrated propulsion system requires an exhaust system that meets the area requirement of both the low-speed range while operating on the turbojet or turbofan engine and the high-speed range while operating on the ramjet engine.

If the high-speed flight vehicle is an expendable weapon system, the exhaust system must be simple, compact, and affordable. As the ramjet is operating at near stoichiometric temperatures, material options for the exhaust nozzle structure are limited.

Further, currently known nozzle designs for air-breathing dual-mode propulsion systems are complicated and have many moving parts, such as convergent flaps, divergent flaps, rollers, flap tracks, hinge points, and other components. For example, FIG. 1 shows a currently known two-dimensional converging-diverging (2D C-D) nozzle assembly 10, which generally includes a transition duct 12 followed by a nozzle 14, the nozzle 14 including a flap assembly 16. The flap assembly 16 includes at least one convergent flap 18 and at least one divergent flap 20. Each convergent flap 18 has a first end 18A that is hingedly connected to a sidewall 22 of the transition duct 12 and a second end 18B that is hingedly connected to a first end 20A of a divergent flap 20. Each divergent flap 20 additionally includes a second end 20B that is free to translate parallel to the nozzle axis and normal to the nozzle axis as the nozzle throat area and exit area are adjusted based on flight mode. Thus, the flap assembly 16 may be articulated and controlled to define a converging portion leading to a throat, and a diverging portion leading from the throat (in the direction of fluid flow). The area of the converging portion, the diverging portion, and the throat may be selected, by adjusting the position of the flap assembly 16, to provide optimal thrust for the particular flight mode. For example, the flap assembly 16 may include flap tracks, rollers, and hinge points that enable articulation of the flaps. Although such a system may be efficient for use in both low-speed mode and high-speed mode, it has a complex design that requires many moving parts and increases costs.

SUMMARY

Some embodiments advantageously provide a two-dimensional variable area plug nozzle assembly for a high-speed flight vehicle. In one embodiment, a variable-area plug nozzle assembly includes: a nozzle including a plurality of sidewalls; a plug body within the nozzle, the plug body abutting at least two of the plurality of sidewalls; a first convergent flap hingedly connected to at least one of the plurality of sidewalls; and a second convergent flap hingedly connected to at least one of the plurality of sidewalls.

In one aspect of the embodiment, the nozzle assembly further comprises a transition duct located upstream of the nozzle, the transition duct having an upstream end and a downstream end opposite the upstream end, the upstream end having a circular cross-sectional shape and the downstream end having a rectangular cross-sectional shape.

In one aspect of the embodiment, the plug body has an upstream end and a downstream end opposite the upstream end, the downstream end having a linear cross-sectional shape.

In one aspect of the embodiment, the transition duct has a first longitudinal axis and the linear cross-sectional shape of the downstream end of the plug body has a second longitudinal axis that is at least substantially orthogonal to the first longitudinal axis.

In one aspect of the embodiment, the plug body includes a first surface extending between the upstream end and the downstream end and a second surface opposite the first surface, each of the first surface and the second surface being at least substantially planar.

In one aspect of the embodiment, the first convergent flap is selectively movable relative to the first surface and the second convergent flap is selectively movable relative to the second surface.

In one aspect of the embodiment, the first convergent flap has a first edge that is hingedly connected to the at least one of the plurality of sidewalls and a second edge opposite the first edge that is a free edge; and the second convergent flap has a first edge that is hingedly connected to the at least one of the plurality of sidewalls and a second edge opposite the first edge that is a free edge.

In one aspect of the embodiment, the plug body is coupled to at least two of the plurality of sidewalls.

In one aspect of the embodiment, the plug body and the at least two of the plurality of sidewalls are composed of a high-temperature-fiber-reinforced composite.

In one aspect of the embodiment, the plug body and the at least two of the plurality of sidewalls include a protective coating.

In one embodiment, a two-dimensional variable-area plug nozzle includes: a plurality of sidewalls and a longitudinal axis; a plug body, the plug body having an upstream end and a downstream end, the downstream end having a longitudinal axis that is at least substantially orthogonal to the longitudinal axis of the two-dimensional variable-area plug nozzle; a first convergent flap having a first edge that is hingedly connected to at least one of the plurality of sidewalls and a second edge that is a free edge; and a second convergent flap having a first edge that is hingedly connected to at least one of the plurality of sidewalls and a second edge that is a free edge.

In one aspect of the embodiment, the plurality of sidewalls includes a first sidewall, a second sidewall opposite the first sidewall, a third sidewall between the first sidewall and the second sidewall, and a fourth sidewall opposite the third sidewall.

In one aspect of the embodiment, the first edge of the first convergent flap is hingedly connected between the first sidewall and the second sidewall, and the first edge of the second convergent flap is hingedly connected between the first sidewall and the second sidewall.

In one aspect of the embodiment, the plug body extends between the first sidewall and the second sidewall.

In one aspect of the embodiment, the plug body abuts the first sidewall and the second sidewall.

In one aspect of the embodiment, the plug body is affixed to the first sidewall and the second sidewall.

In one aspect of the embodiment, the plug body includes a first surface extending between the upstream end and the downstream end and a second surface opposite the first surface, each of the first surface and the second surface being at least substantially planar.

In one aspect of the embodiment, the first convergent flap is selectively movable relative to the first surface and the second convergent flap is selectively movable relative to the second surface.

In one aspect of the embodiment, the plug body is composed of a high-temperature-fiber-reinforced composite.

In one aspect of the embodiment, the plug body and the plurality of sidewalls include a protective coating.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
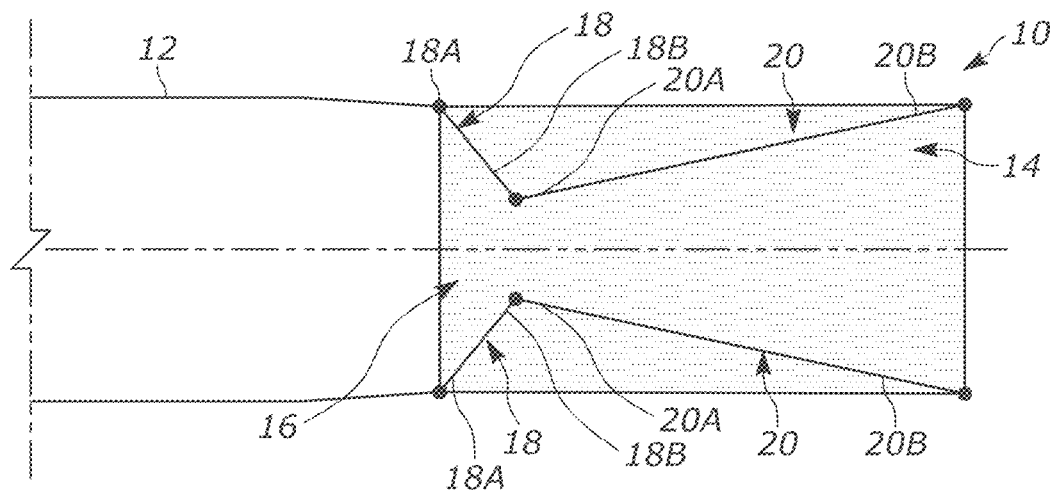
FIG. 1 shows a simplified side cross-sectional view of a currently known two-dimensional converging-diverging nozzle assembly.

Before describing in detail exemplary embodiments, it is noted that the embodiments reside primarily in combinations of apparatus components and steps related to a variable-area 2D plug nozzle. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
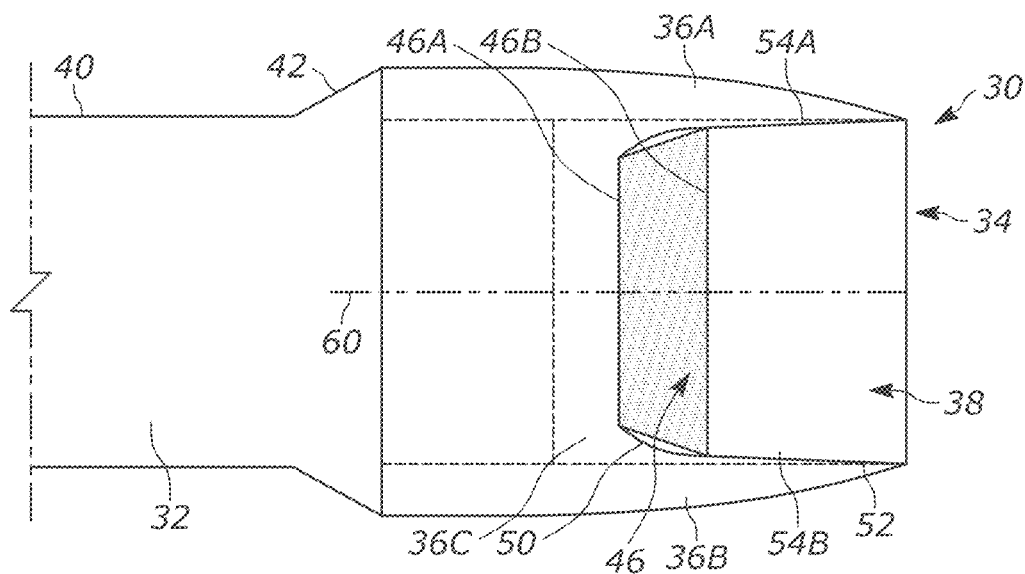
FIG. 2 shows a simplified top view of a 2D variable-area plug nozzle assembly, in accordance with the present disclosure.
Figure 3:
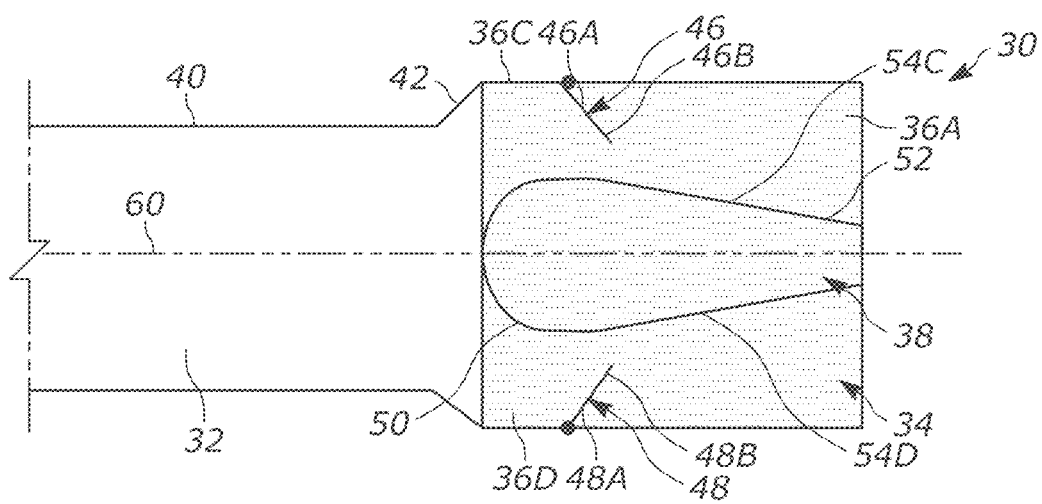
FIG. 3 shows a simplified side-cross-sectional view of the 2D variable-area plug nozzle assembly of FIG. 2, in accordance with the present disclosure.
Figure 4:
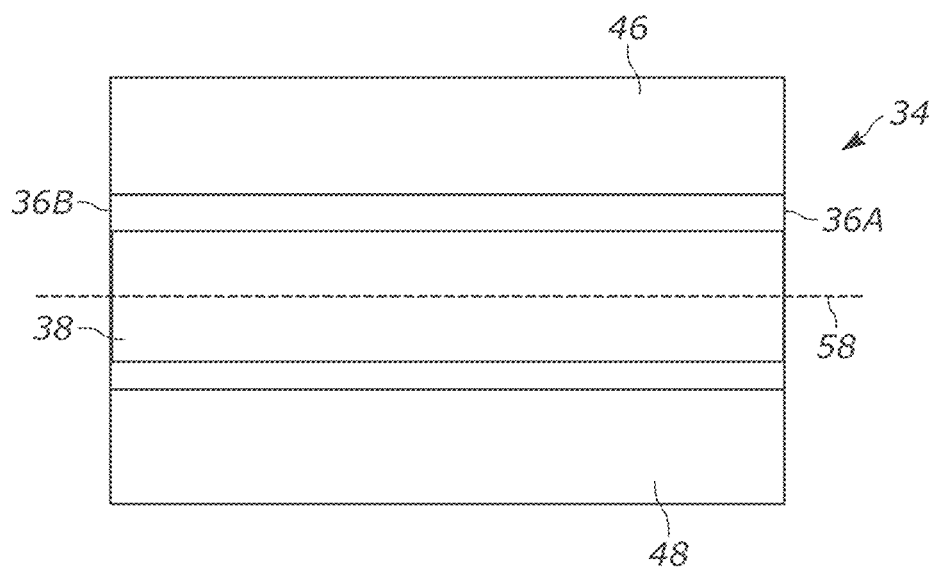
FIG. 4 shows a simplified view of a downstream end of a plug body of the 2D variable-area plug nozzle assembly of FIG. 2, in accordance with the present disclosure.

Referring now to the figures in which like reference designators are used for like elements, a 2D variable-area plug (VAP) nozzle assembly is shown in FIGS. 2-4. FIG. 2 shows a top view thereof; FIG. 3 shows a side cross-sectional view thereof; and FIG. 4 shows a view of a downstream end thereof. The 2D VAP nozzle assembly 30 generally includes a transition duct 32 followed by a nozzle 34 having sidewalls 36 and a plug body 38. That is, the transition duct 32 includes a forward or upstream end 40 and an aft or downstream end 42, and the nozzle 34 is coupled to, affixed to, extends from, or otherwise is located downstream of the downstream end 42 of the transition duct 32. In contrast to the currently known two-dimensional converging-diverging nozzle assembly 10 of FIG. 1, the 2D VAP nozzle assembly 30 of FIGS. 2-4 includes only two convergent flaps (a first convergent flap 46 and a second convergent flap 48, shown in FIG. 3), which not only simplifies the nozzle design and reduces cost, but also reduces the length of the sidewalls and, therefore, the nozzle overall.

Continuing to refer to FIGS. 2-4, in one embodiment, the transition duct 32 has a circular cross-sectional shape at the upstream end 40, which transitions to a polygonal cross-sectional shape (for example, a square or rectangular cross-sectional shape) at the downstream end 42. In one embodiment, the polygonal cross-sectional shape has a larger maximum outer dimension than the circular cross-sectional shape (that is, in one embodiment the downstream end 42 of the transition duct 32 is wider or larger in cross-sectional shape than the upstream end 40 of the transition duct 32), but it will be understood that other configurations may be used. In one embodiment, the nozzle 34 has the same, or substantially the same, polygonal cross-sectional shape of the downstream end 42 of the transition duct 32 along at least a portion of the length of the nozzle 34. It will be understood that other cross-sectional shapes, sizes, and/or configurations of the transition duct 32, the nozzle 34, and/or other components of the 2D VAP nozzle assembly 30 may be used, and the cross-sectional shape of the nozzle, size and/or configuration of the convergent flaps, and/or other characteristics may be chosen depending on the size of the engine, type of vehicle in which the 2D VAP nozzle assembly is used, and other considerations or uses. For example, in one non-limiting example, the upstream and downstream ends 40, 42 of the transition duct 32 may have the same cross-sectional shape, maximum outer diameter, or other characteristics.

Continuing to refer to FIGS. 2-4, in one embodiment the plug body 38 has a lateral configuration, with an upstream or leading portion 50 that has a curved surface and a downstream or trailing portion 52 that has a more linear cross-sectional shape. In one embodiment, the plug body 38 defines a plurality of planar, or at least substantially planar, surfaces between the upstream portion 50 and the downstream portion 52. In one embodiment, the plug body 38 defines a first surface 54A (for example, on the right side of the plug body 38 when the nozzle 34 is in use), a second surface 54B (for example, on the left side of the plug body 38 when the nozzle 34 is in use) opposite the first surface 54A, a third surface 54C (for example, on the upper side of the plug body 38 when the nozzle 34 is in use) between the first and second surfaces 54A, 54B, and a fourth surface 54D opposite the third surface 54C (for example, on the lower side of the plug body 38 when the nozzle 34 is in use). In one embodiment, the plug body 38 is contoured such that the surfaces 54A-54D smoothly transition into each other along the length of the plug body 38. In some embodiments, the downstream portion 52 of the plug body 38 has a rectangular or elongated oval cross-sectional shape, or another shape having a longitudinal axis (for example, as shown in FIG. 4). In one embodiment, the downstream portion 52 of the plug body 38 is elongated along a longitudinal axis 58 that is orthogonal to, or at least substantially orthogonal to, the longitudinal axis 60 of the 2D VAP nozzle assembly 30, which lies along the general direction of fluid flow through the transition duct 32 and nozzle 34.

Continuing to refer to FIGS. 2-4, in one embodiment, the nozzle 34 includes a first sidewall 36A (for example, a right sidewall when the nozzle 34 is in use), a second sidewall 36B opposite the first sidewall 36A (for example, a left sidewall when the nozzle 34 is in use), a third sidewall 36C between the first and second sidewalls 36A, 36B (for example, an upper sidewall when the nozzle 34 is in use), and a fourth sidewall 36D opposite the third sidewall 36C (for example, a lower sidewall when the nozzle 34 is in use). In one embodiment, as shown in FIG. 2, the plug body 38 meets, abuts, or is coupled to opposing first and second sidewalls 36A, 36B of the nozzle at or along the plug body's first and second surfaces 54A, 54B (that is, on opposite ends of the linear cross-sectional shape), which allows the plug body 38 to reinforce the sidewalls 36 and form a robust structural element. In one embodiment, the plug body 38 (for example, along the first surface 54A and the second surface 54B) is affixed or coupled to the sidewalls 36A, 36B to form a unitary body. Additionally, in one embodiment, the first sidewall 36A and the second sidewall 36B extend farther in the downstream direction than either of the third sidewall 36C (upper wall) or fourth sidewall 36D (lower wall). This is shown in the top view of FIG. 2, in which the first and second sidewalls 36A, 36B extend beyond the third sidewall 36C and the plug body 38 is exposed from above. However, it will be understood that other suitable configurations may be used.

Continuing to refer to FIGS. 2-4, the convergent flaps 46, 48 are each coupled to one or more sidewalls 36 of the nozzle 34 to ensure stable and smooth actuation of the convergent flaps 46, 48 relative to the plug body 38. In one embodiment, each of the first and second convergent flaps 46, 48 is hingedly coupled to one or more sidewalls of the nozzle 34 such that the first convergent flap 46 extends between the first and second sidewalls 36A, 36B proximate the third sidewall 36C and the second convergent flap 48 extends between the first and second sidewalls 36A, 36B proximate the fourth sidewall 36D. Further, in one embodiment each of the first and second convergent flaps 46, 48 are hingedly coupled to one or more sidewalls of the nozzle 34 at locations that are proximate the upstream portion 50 of the plug body 38. In one embodiment, the first convergent flap 46 is hingedly coupled to the third sidewall 36C and the second convergent flap 48 is hingedly coupled to the fourth sidewall 36D. Additionally or alternatively, the first convergent flap 46 and/or the second convergent flap 48 may each be hingedly or movably connected to the first sidewall 36A and/or the second sidewall 36B. For example, the first convergent flap 46 may be coupled to just the third sidewall 36C, to both the first and second sidewalls 36A, 36B, or to all three of the first, second, and third sidewalls 36A, 36B, 36C. Likewise, the second convergent flap 48 may be coupled to just the fourth sidewall 36D, to both the first and second sidewalls 36A, 36B, or to all three of the first, second, and fourth sidewalls 36A, 36B, 36D. However, it will be understood that other suitable coupling configurations are contemplated. Thus, each convergent flap 46, 48 is connected or coupled to one or more sidewalls of the nozzle 34 such that the convergent flaps 46, 48 are stably and hingedly or movably coupled within the nozzle.

Continuing to refer to FIGS. 2-4, each of the first and second convergent flaps 46, 48 has a first edge 46A, 48A that is hingedly coupled to at least one corresponding sidewall and a second edge 46B, 48B opposite the first edge that is a free edge movable relative to a corresponding surface of the plug body 38. In one embodiment, the first edge 46A of the first convergent flap 46 is hingedly connected to at least one sidewall so the second edge 46B of the first convergent flap 46 is selectively movable closer to or farther away from the third surface 54C of the plug body 38, and the first edge 48A of the second convergent flap 48 is hingedly connected to at least one sidewall so the second edge 48B of the second convergent flap 48 is selectively movable closer to or farther away from the fourth surface 54D of the plug body 38. Thus, the convergent flaps 46, 48 may be adjusted to effectively form two throat areas (for example, one above the plug body 38 and one below the plug body 38 when the nozzle 34 is in use), the size or area of which being chosen based on, for example, the flight mode.

Continuing to refer to FIGS. 2-4, the sidewalls 36 (or nozzle 34 as a whole), convergent flaps 46, 48, and/or plug body 38 are composed of a material that is capable of withstanding high temperatures. In one embodiment, the sidewalls 36 and plug body 38 are composed of a high-temperature-fiber-reinforced composite. For short-term applications, such as use in expendable flight vehicles, carbon-carbon provides a unique capability for the sidewall 36 and plug body 38 (which, for example, may be formed as a unitary body) as it eliminates or minimizes the need for active cooling. Additionally, in some embodiments the transition duct 32, sidewalls 36, plug body 38, and/or convergent 46, 48 flaps include a protective coating, such as an environmental barrier coating to minimize oxidative degradation of the structure.

Figure 5:
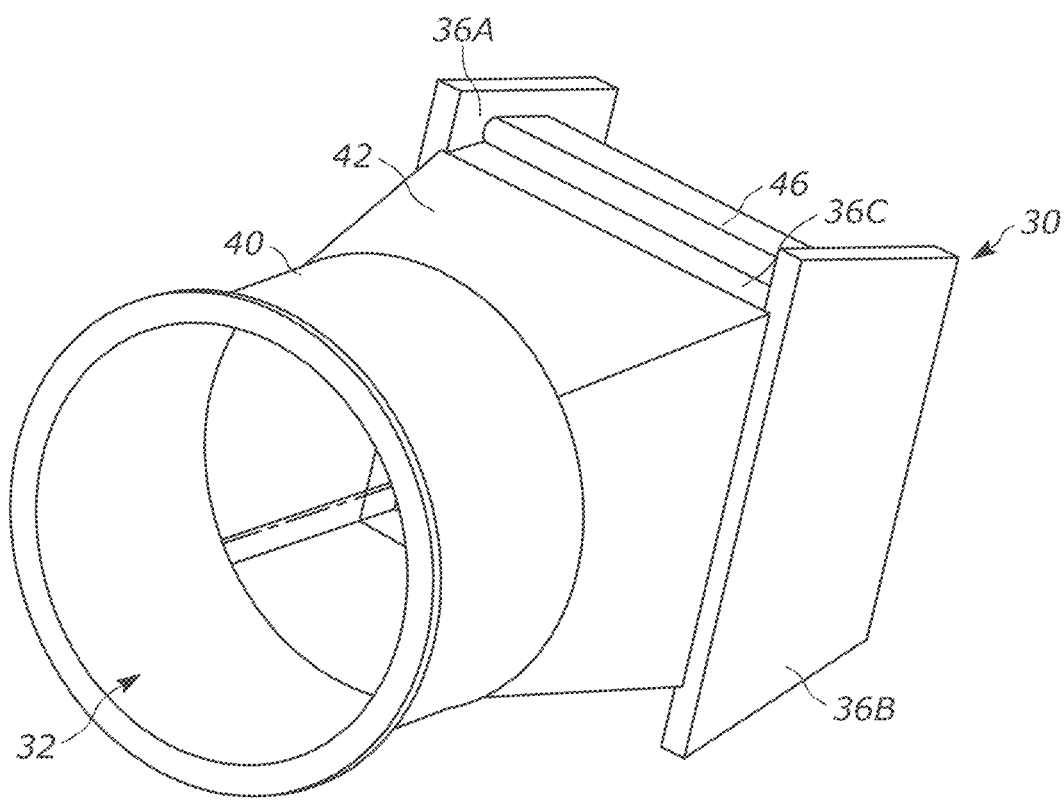
FIG. 5 shows a three-dimensional view of an exemplary 2D variable-area plug nozzle assembly, in accordance with the present disclosure.

Referring now to FIG. 5, a three-dimensional view of an exemplary 2D VAP nozzle assembly 30 of FIGS. 2-4 is shown. The view shown in FIG. 5 is taken from the upstream-to-downstream direction. The components of the 2D VAP nozzle assembly 30 of FIG. 5 are the same as those of FIGS. 2-4 and corresponding reference numbers are used. FIG. 5 illustrates one exemplary configuration of nozzle, 34, with a transition duct 32 and first, second, and third sidewalls 36A-36C and a first convergent flap 46 of the 2D VAP nozzle assembly 30 being visible.

Figure 6:
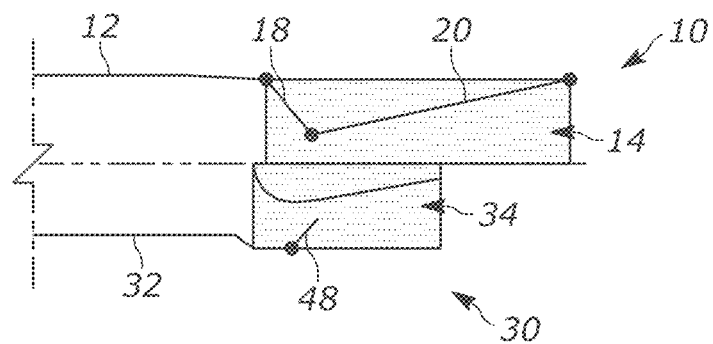
FIG. 6 shows a side-by-side comparison of side half-cross-sectional views of the currently known two-dimensional converging-diverging nozzle assembly of FIG. 1 and the 2D variable-area plug nozzle assembly of FIGS. 2-4, in accordance with the present disclosure.

Referring now to FIG. 6, a side-by-side comparison of top half-cross-sectional views of the currently known 2D C-D nozzle assembly 10 of FIG. 1 and the 2D VAP nozzle assembly 30 of FIGS. 2-5 is shown. The 2D VAP nozzle assembly 30 shown and described herein is simpler than the currently known 2D C-D nozzle assembly 10 in that it employs only two convergent flaps 46, 48 instead of multiple convergent and divergent flaps 18, 20. This also eliminates the flap tracks, rollers, and connecting hinges of the 2D C-D nozzle assembly 10. Additionally, in one embodiment the sidewalls 36 of the 2D VAP nozzle assembly 30 are reduced in length on the order of approximately 50% relative to those of the 2D C-D nozzle assembly 10 due to the shorter characteristics of the 2D VAP nozzle design. Finally, in one embodiment the plug body 38 of the 2D VAP nozzle assembly 30 ties the sidewalls 36 together and forms a robust structural element. Although the nozzle assemblies 10, 30 shown in FIG. 6 may not be drawn to scale, FIG. 6 illustrates the simplified design and opportunity for a shorter nozzle overall.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A variable-area plug nozzle assembly comprising:
    a nozzle including a plurality of sidewalls;
    a plug body within the nozzle, the plug body abutting at least two of the plurality of sidewalls, the plug body including an upstream end and a downstream end opposite the upstream end; and
    only a single pair of convergent flaps, the single pair of convergent flaps including:
        a first convergent flap hingedly connected to at least one of the plurality of sidewalls at a location proximate the upstream end of the plug body; and
        a second convergent flap hingedly connected to at least one of the plurality of sidewalls at a location proximate the upstream end of the plug body.

2. The variable-area plug nozzle assembly of claim 1, further comprising a transition duct located upstream of the nozzle, the transition duct having an upstream end and a downstream end opposite the upstream end, the upstream end having a circular cross-sectional shape and the downstream end having a rectangular cross-sectional shape.

3. The variable-area plug nozzle assembly of claim 2, wherein the downstream end of the plug body has a linear cross-sectional shape.

4. The variable-area plug nozzle assembly of claim 3, wherein the transition duct has a first longitudinal axis and the linear cross-sectional shape of the downstream end of the plug body has a second longitudinal axis that is at least substantially orthogonal to the first longitudinal axis.

5. The variable-area plug nozzle assembly of claim 4, wherein the plug body includes a first surface extending between the upstream end and the downstream end and a second surface opposite the first surface, each of the first surface and the second surface being at least substantially planar.

6. The variable-area plug nozzle assembly of claim 5, wherein the first convergent flap is selectively movable relative to the first surface and the second convergent flap is selectively movable relative to the second surface.

7. The variable-area plug nozzle assembly of claim 1, wherein:
    the first convergent flap has a first edge that is hingedly connected to the at least one of the plurality of sidewalls and a second edge opposite the first edge that is a free edge; and
    the second convergent flap has a first edge that is hingedly connected to the at least one of the plurality of sidewalls and a second edge opposite the first edge that is a free edge.

8. The variable-area plug nozzle assembly of claim 1, wherein the plug body is coupled to at least two of the plurality of sidewalls.

9. The variable-area plug nozzle assembly of claim 8, wherein the plug body and the at least two of the plurality of sidewalls are composed of a high-temperature-fiber-reinforced composite.

10. The variable-area plug nozzle assembly of claim 9, wherein the plug body and the at least two of the plurality of sidewalls include a protective coating.

11. A two-dimensional variable-area plug nozzle, comprising:
    a plurality of sidewalls and a longitudinal axis, the plurality of sidewalls including:
        a first sidewall;
        a second sidewall opposite the first sidewall;
        a third sidewall between the first sidewall and the second sidewall; and
        a fourth sidewall opposite the third sidewall;
    a plug body, the plug body having an upstream end and a downstream end, the downstream end having a longitudinal axis that is at least substantially orthogonal to the longitudinal axis of the two-dimensional variable-area plug nozzle;
    a first convergent flap having a first edge that is hingedly connected to at least one of the plurality of sidewalls at a location proximate the upstream end of the plug body, the first convergent flap further having a second edge that is a free edge; and
    a second convergent flap having a first edge that is hingedly connected to at least one of the plurality of sidewalls at a location proximate the upstream end of the plug body, the second convergent flap further having a second edge that is a free edge.

12. The two-dimensional variable-area plug nozzle of claim 11, wherein the first edge of the first convergent flap is hingedly connected between the first sidewall and the second sidewall, and the first edge of the second convergent flap is hingedly connected between the first sidewall and the second sidewall.

13. The two-dimensional variable-area plug nozzle of claim 11, wherein the plug body extends between the first sidewall and the second sidewall.

14. The two-dimensional variable-area plug nozzle of claim 13, wherein the plug body abuts the first sidewall and the second sidewall.

15. The two-dimensional variable-area plug nozzle of claim 13, wherein the plug body is affixed to the first sidewall and the second sidewall.

16. The two-dimensional variable-area plug nozzle of claim 11, wherein the plug body includes a first surface extending between the upstream end and the downstream end and a second surface opposite the first surface, each of the first surface and the second surface being at least substantially planar.

17. The two-dimensional variable-area plug nozzle of claim 16, wherein the first convergent flap is selectively movable relative to the first surface and the second convergent flap is selectively movable relative to the second surface.

18. The two-dimensional variable-area plug nozzle of claim 11, wherein the plug body is composed of a high-temperature-fiber-reinforced composite.

19. The two-dimensional variable-area plug nozzle of claim 18, wherein the plug body and the plurality of sidewalls include a protective coating.

\* \* \* \* \*